United States Patent
Chang (10) Patent No.: US 10,654,556 B2
(45) Date of Patent: May 19, 2020

(54) VTOL AIRCRAFT WITH WINGS

(71) Applicant: Jiann-Chung Chang, New Taipei (TW)

(72) Inventor: Jiann-Chung Chang, New Taipei (TW)

( * ) Notice: Subject to any disclaimer, the term of this patent is extended or adjusted under 35 U.S.C. 154(b) by 609 days.

(21) Appl. No.: 15/369,870

(22) Filed: Dec. 5, 2016

(65) Prior Publication Data
US 2018/0155017 A1  Jun. 7, 2018

(51) Int. Cl.
*B64C 3/38* (2006.01)
*B64C 39/08* (2006.01)
*B64C 29/00* (2006.01)
*B64C 3/10* (2006.01)

(52) U.S. Cl.
CPC .............. *B64C 3/38* (2013.01); *B64C 3/10* (2013.01); *B64C 29/0075* (2013.01); *B64C 39/08* (2013.01)

(58) Field of Classification Search
CPC .... B64C 3/10; B64C 3/38; B64C 5/16; B64C 29/0075; B64C 39/08; B64D 27/02; B64D 27/08; B64D 27/14; B64D 27/20
USPC ........................ 244/4 A, 13, 23 A, 23 B, 23 R
See application file for complete search history.

(56) References Cited

U.S. PATENT DOCUMENTS

| | | | | |
|---|---|---|---|---|
| 2,575,185 A | * | 11/1951 | Mulholland | B64C 3/14 244/35 R |
| 2,719,014 A | * | 9/1955 | Koppen | B64C 5/16 244/13 |
| 2,926,868 A | * | 3/1960 | Taylor | B64C 29/0075 244/12.4 |
| 3,165,280 A | * | 1/1965 | Shao-Tang | B64C 29/0075 244/12.4 |
| 3,181,810 A | * | 5/1965 | Olson | B64C 29/0033 244/7 R |
| 3,469,803 A | * | 9/1969 | Schmielau | B64C 29/0075 244/12.4 |
| 3,606,210 A | * | 9/1971 | Busby | B64C 29/0075 244/12.4 |
| 3,830,448 A | * | 8/1974 | Lippisch | B60V 1/22 244/2 |
| 4,043,523 A | * | 8/1977 | Bartoe, Jr. | B64C 5/16 244/87 |
| 4,492,353 A | * | 1/1985 | Phillips | B64C 29/0075 244/12.4 |
| 5,419,514 A | * | 5/1995 | Ducan | B64C 29/0033 244/12.4 |

(Continued)

*Primary Examiner* — Richard R. Green
*Assistant Examiner* — Brady W Frazier
(74) *Attorney, Agent, or Firm* — Hershkovitz & Associates, PLLC; Abe Hershkovitz (57) ABSTRACT

A VTOL aircraft is provided with a fuselage, a pair of first thrust units, a pair of second thrust units, and a pair of first wings. The first thrust units and the second thrust units are tiltably mounted on the fuselage. The first wings are securely mounted on the fuselage, and each first wing has a root end and an outer end. The longitudinal length of the outer end is larger than that of the root end. Thus, when the VTOL aircraft is landing or taking off, the airflow can pass around the root ends of the first wings; when the VTOL aircraft is cruising or gliding, the wings can provide lift, so that the first thrust units and the second thrust units can operate in a low mode, which makes the VTOL aircraft save energy and land safely even when the thrust units are broken.

19 Claims, 9 Drawing Sheets

(56) References Cited

U.S. PATENT DOCUMENTS

| | | | | |
|---|---|---|---|---|
| 6,158,540 A * | 12/2000 | Rice | .......... | B60V 1/04 |
| | | | | 180/117 |
| 6,886,776 B2 * | 5/2005 | Wagner | ............ | B64C 3/56 |
| | | | | 244/12.4 |
| 6,892,980 B2 * | 5/2005 | Kawai | ............ | B64C 11/001 |
| | | | | 244/12.4 |
| 7,472,863 B2 * | 1/2009 | Pak | ............ | A63H 27/14 |
| | | | | 244/12.5 |
| 8,833,692 B2 * | 9/2014 | Yoeli | ............ | B64C 29/0025 |
| | | | | 244/23 A |
| 9,694,908 B2 * | 7/2017 | Razroev | ............ | B64C 29/0033 |
| 2005/0230519 A1 * | 10/2005 | Hurley | ............ | B64C 29/0033 |
| | | | | 244/7 C |
| 2011/0315809 A1 * | 12/2011 | Oliver | ............ | B64C 29/0033 |
| | | | | 244/12.4 |
| 2012/0056040 A1 * | 3/2012 | Brotherton-Ratcliffe | ............ | |
| | | | | B64C 27/20 |
| | | | | 244/23 A |
| 2012/0234968 A1 * | 9/2012 | Smith | ............ | B64C 29/0033 |
| | | | | 244/12.3 |
| 2012/0298789 A1 * | 11/2012 | Oz | ............ | B64C 15/12 |
| | | | | 244/12.4 |
| 2012/0312928 A1 * | 12/2012 | Gratzer | ............ | B64C 23/065 |
| | | | | 244/199.4 |
| 2015/0183518 A1 * | 7/2015 | Stuckl | ............ | B64C 3/10 |
| | | | | 244/13 |
| 2016/0229532 A1 * | 8/2016 | Shapery | ............ | B64C 29/0075 |
| 2017/0113795 A1 * | 4/2017 | Duque | ............ | B64C 39/024 |

* cited by examiner

VTOL AIRCRAFT WITH WINGS

BACKGROUND OF THE INVENTION

1. Field of the Invention

The present invention relates to an air vehicle, especially to a vertical taking-off and landing (hereinafter referred to as VTOL) aircraft.

2. Description of the Prior Arts

Contemporary in-service or experimental VTOL aircrafts rely on thrust continuously contributed from propellers or jet flow in an opposite direction of gravity to maintain the airborne. Their lift is generated by two, four or more numbers of thrust units. Gravity at a center of vertical taking off and landing is supported stably through those vertical thrust units equipped evenly. For safety consideration, some announced designs utilize redundancy thrust units to avoid any chance that a stability of a lift system for supporting an aircraft is broken. Afterwards, both longitudinal and lateral thrust forces are controllable and stable, too. The forward flight driven thrust is obtained by adjusting an angle of shafts of thrusts with respect to a horizontal line. Because the idea of minimizing the sizes of wings of VTOL airplane is abandoned and the idea of controlling the wings of VTOL airplane is dismissed, the contemporary VTOL airplane cannot perform some important maneuver, such as gliding. Most birds use inherently passive wings to provide safe lift when gliding and endurance of long-distance flight with energy efficiency to themselves.

Such configurations of lifting and pulling in an active way to support an aircraft, such as a tilt-rotor or quadcopter, are incapable of inducing both lift and thrust at the same time, and are so vulnerable that the machines are broken. A few matured models encounter a lot of accidents. Such design always faces safety issue challenge.

Meanwhile, the importance of energy efficiency of VTOL aircraft is almost ignored and are not discussed and mentioned in existing design.

Another major benefit induced by wings is that lift coefficient (hereinafter referred to as Cl) vs. drag coefficient (hereinafter referred to as Cd) of airfoil and angle of attack for lifting traditional forward flight has been optimized by the aviation industry. By doing so, the airplane can get benefits of energy efficiency in long distance flight. The passenger airliners nowadays fly in a standard procedure as throttles are fully opened in takeoff till they attain cruise attitude, then throttle downward to a lower level enough to maintain cruise velocity. During the flight operation, wing angle of attack of the aircraft is adjusted too to utilize best Cl value and reduce Cd. The civil aviation society even searches for new procedure for landing an aircraft by gliding to reduce overall industry fuel consumption.

Traditionally an airplane has wings to create lift, which has been recognized as a means of efficient energy utilization especially at long distance straight flight. Civil airliners advertised their fuel consumption equal to or less than four-person automobiles during cross-continental flight travel. Considering that a great number of VTOL aircrafts will enter service in a near future, integrating wings into VTOL design is a vital engineering solution for the aviation industry in energy utilization and environmental protection as a whole. A helicopter is inferior to an airliner in range, safety and fuel consumption efficiency, which restricts itself to special transportation applications only.

CL to CD value is an oversight in most VTOL designs since no wings exist in their aircrafts. When most of the energy of thrust is used to create lift to overcome gravity, it will consume lots of energy and limit flight range, too. That will be a huge disadvantage when industry pursues large battery or fuel cell volume for acceptable flight distance. Considering there is a huge VTOL fleet under service, the energy saving will turn to be an unavoidable issue and be examined.

In existing and published VTOL aircrafts, the thrust force is split into vertical and horizontal directions. The vertical component of force works as lift against the weight of the aircraft. The horizontal component of force provides pull force to drive the aircraft to conduct a straight flight.

Traditional airplane lift relies on an elliptical shape negative pressure distribution along a wingspan. Nowadays, two types of VTOL aircraft design are popularly applied. One is tilted rotor type and the other is mainly thrust vertically with vectoring forward capability. Only a few of the latter are equipped small with sized canard wings to function minor lift but major control. A tiltable rotor airplane is designed with grab wing lift capability during long distance flight so that the tiltable rotor airplane also keeps the energy saving advantage. Nevertheless, the safety of the tilt rotor airplane is not insured by the industry after so many accidents have happened because of active lift disequilibrium caused by mechanical failure. The latter type utilizes redundancy idea to overcome the safety problem but does not have any energy saving solution during a long distance flight by electrical propulsion's poor efficient nowadays. Therefore, even giant aircraft manufacturers consider it suitable for urban transportation.

To overcome the shortcomings, the present invention provides a VTOL aircraft to mitigate or obviate the aforementioned problems.

SUMMARY OF THE INVENTION

The main objective of the present invention is to provide a VTOL aircraft that can take off or land stably, and save energy during level flight.

The VTOL aircraft has:
  a fuselage comprising a length direction;
  a pair of first thrust units tiltably mounted on an upper portion of the fuselage and mounted on two sides of the fuselage respectively;
  a pair of first wings securely mounted on the upper portion of the fuselage and on the two sides of the fuselage respectively, and the first wings disposed behind and above the pair of first thrust units; each one of the first wings comprising:
    a root end mounted on the fuselage; and
    an outer end opposite the root end, a longitudinal length of the outer end parallel with the length direction being larger than that of the root end of the first wing; and
  a pair of second thrust units tiltably mounted on a lower portion of the fuselage and mounted on the two sides of the fuselage respectively; the second thrust units disposed behind the first thrust units.

Consequently, when the present VTOL aircraft is landing or taking off by tilting the first thrust units and the second thrust units, the airflow can pass around the root ends of the wings, and thereby drags of the wings are low. When the present VTOL aircraft is cruising or gliding, the wings can provide lift, so that the first thrust units and the second thrust units can operate in a low mode, which makes the present VTOL aircraft save more energy. Besides, even one or more thrust units are broken during flight, the present VTOL aircraft can glide with the wings and land safely.

Other objectives, advantages and novel features of the invention will become more apparent from the following detailed description when taken in conjunction with the accompanying drawings.

DETAILED DESCRIPTION OF THE PREFERRED EMBODIMENTS

Please refer to FIGS. 1 to 4. A vertical taking-off and landing (hereinafter referred to as VTOL) aircraft comprises a fuselage 10, a plurality of pairs of thrust units, and at least one pair of wings.

In a first embodiment, the fuselage 10 of the VTOL aircraft comprises a pilot cabin 11, a passage 12, two transmission chambers 13, a payload cabin 14, a tail rod 15, and a landing truss 16. The fuselage 10 has a length direction.

Figure 4:
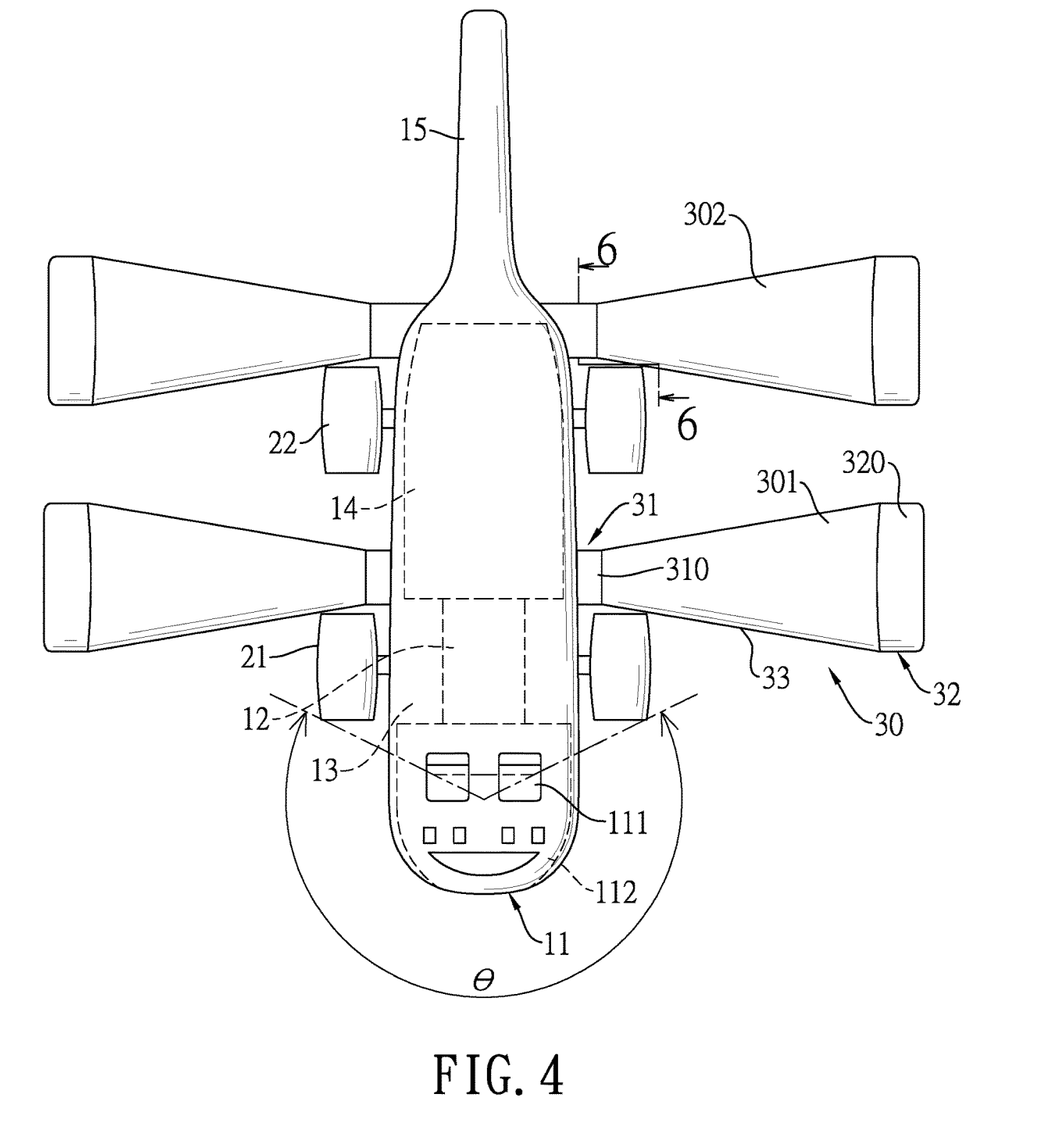
FIG. 4 is a top view of the VTOL aircraft in FIG. 1.

The pilot cabin 11 is located at a front end of the fuselage 10 and comprises two abreast seats 111 and a window 112. The two abreast seats 111 are juxtaposed and mounted in the pilot cabin 11. The window 112 is in front of the abreast seats 111 and extends to two sides of the two abreast seats 111. In other words, rear edges of the window 112 are behind pilots, which causes pilots' view angle θ in the pilot cabin 11 to be over 180 or 270 degrees horizontally as shown in FIG. 4.

The passage 12 is spaced apart from the abreast seats 11 and behind the abreast seats 111, one end of the passage 12 communicates to the pilot cabin 11, and another end of the passage 12 communicates to the payload cabin 14. The transmission chambers 13 are behind the pilot cabin 11 and on two sides of the passage 12. The two transmission chambers 13 are servomotors, stepping motors or linear actuators.

The payload cabin 14 extends along the pilot cabin 11 and the passage 12 in the length direction of the fuselage 10. A space in the payload cabin 14 can accommodate passengers or cargos on board. The payload cabin 14 comprises a thick floor and another space beneath the thick floor. In the space beneath the thick floor are electrical batteries, ultra-capacitors, fossil fuel, or fuel cells.

The tail rod 15 is formed at a rear end of the fuselage 10 extending horizontally. The landing truss 16 is mounted on a bottom surface of the fuselage 10 on a level that allows thrust units to exhaust air streams.

Since the present VTOL aircraft no longer needs any tire and landing gear which is designed for absorbing touch down impact energy and usually occupies huge volume and is constructed in large space, spaces in the pilot cabin 11, the passage 12, and the payload cabin 14 can be enlarged now.

The present VTOL aircraft further comprises a flight computer within the fuselage 10 for collecting data from inertia sensors and for assisting pilots to monitor attitude of the present VTOL aircraft so that the pilots can adjust thrust units.

Figure 1:
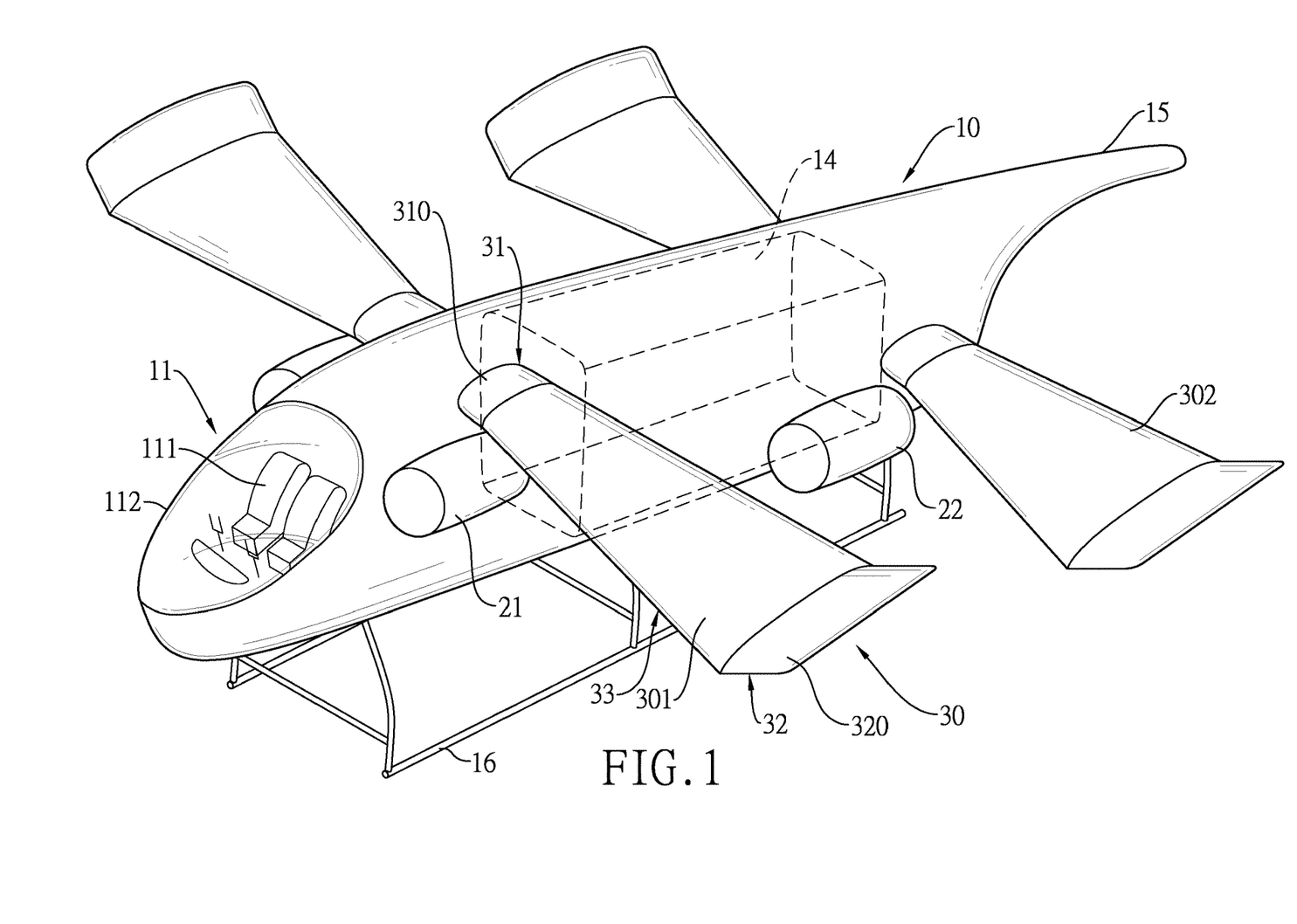
FIG. 1 is a perspective view of a VTOL aircraft in accordance with a first embodiment of the present invention.
Figure 5:
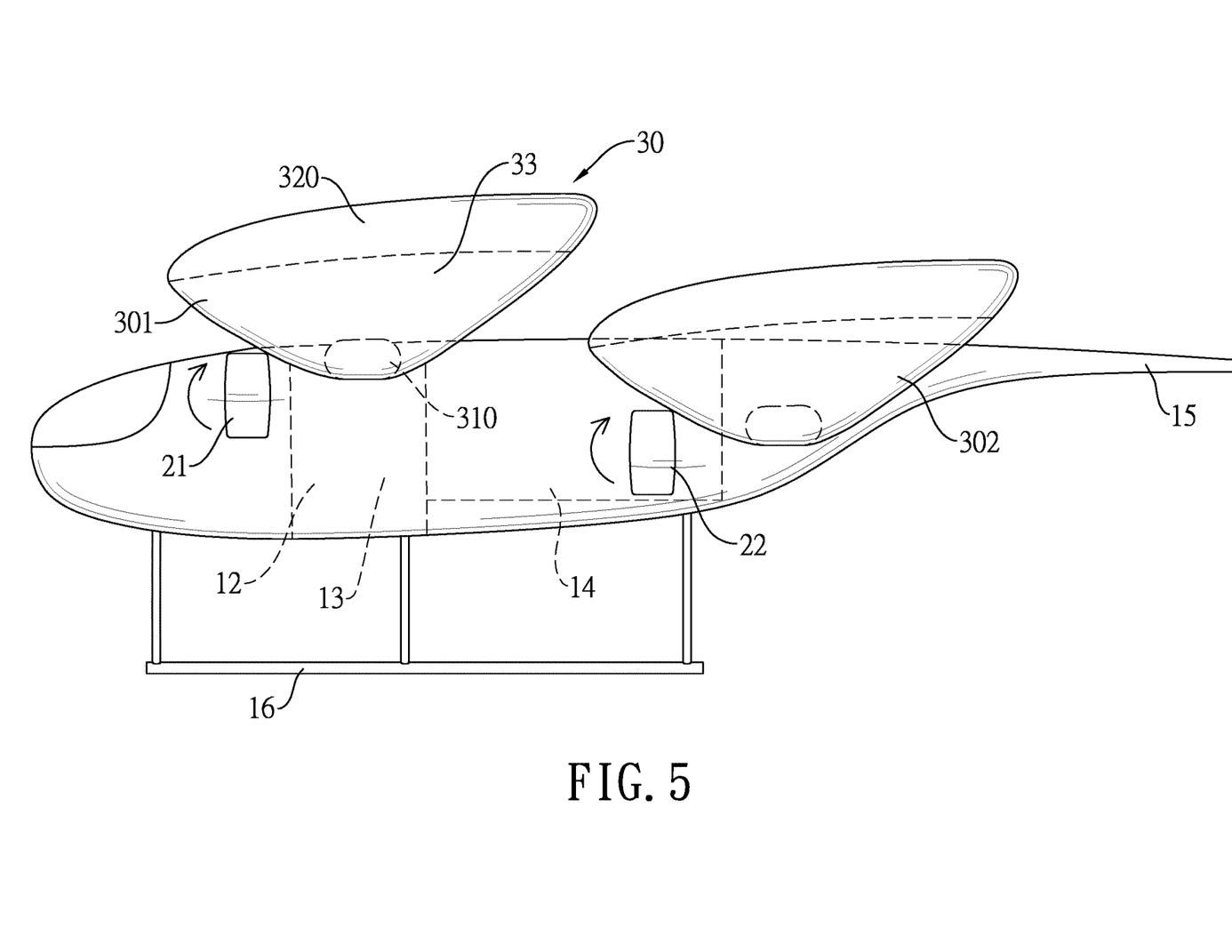
FIG. 5 is a perspective view of the VTOL aircraft in FIG. 1 after the thrust units are tilted to be vertical.
Figure 6A:
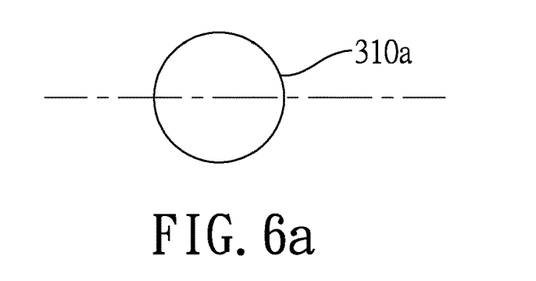
FIGS. 6a to 6e are cross-sectional views of variance wing connecting portions of the VTOL aircraft across line 6-6 in FIG. 4.
Figure 6B:
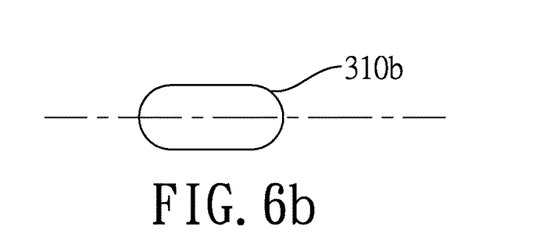
Figure 6C:
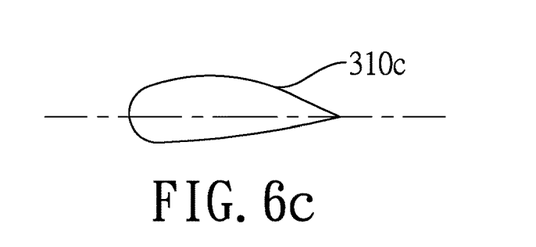
Figure 6D:
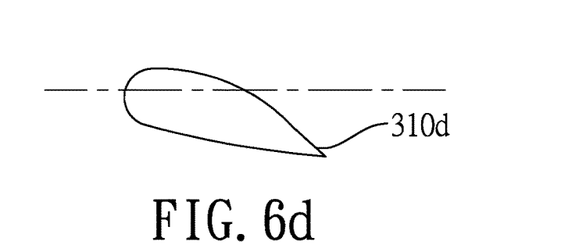
Figure 6E:
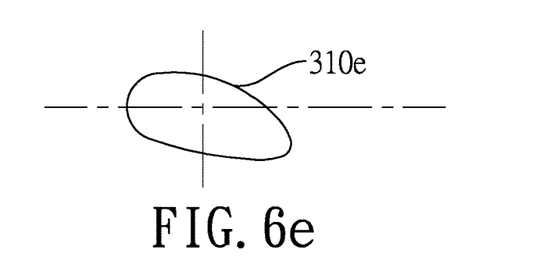

Please refer to FIGS. 1 and 5. The two pairs of thrust units are a pair of first thrust units 21 and a pair of the second thrust units 22. Both the first thrust units 21 and the second thrust units 22 are on the sides of the fuselage 10 respectively. Incidence angles of the first thrust units 21 and the second thrust units 22 relative to longitudinal axis of VTOL aircraft are controlled by the servomotor, the stepping motors, or the linear actuators in the transmission chambers 13 during the flight operation, either in a synchronized mode or an unsynchronized mode. In the synchronized mode, the incidence angles of the first thrust units 21 and the second thrust units 22 are controlled at the same angle; in the unsynchronized mode, the incidence angles of the first thrust units 21 and the second thrust units 22 are controlled independently. Therefore, thrust angle of the present VTOL aircraft is adjustable through adjusting the incidence angles of the first thrust units 21 and the second thrust units 22.

The first thrust units 21 are tiltably mounted on an upper portion of the fuselage 10; precisely, the first thrust units 21 are behind the pilot cabin 11 and in a line leveled above the abreast seats 111. In other words, the pilots may not be shaded by the first thrust units 21.

The pair of the second thrust units 22 is tiltably mounted on a lower portion of the fuselage 10 and behind the first thrust units 21.

In the present VTOL aircraft, each wing is Extended Outward Expansion Wing (hereinafter referred to as EOEW), which is like wings of hummingbirds or honeybees, etc. An airflow direction around hummingbirds or bees is perpendicular to a centerline of their bodies, and a wing root portion of a hummingbird or bee connecting to its body is smaller than that of a wing chord in length. So, these creatures can hover in a way of energy conservation and ascend with less drag.

Therefore, each wing 30 of the present VTOL aircraft includes a root end 31, an outer end 32 opposite the root end 31, and a wing body 33, and a longitudinal length of the outer end 32 parallel with the length direction of the fuselage 10 is larger than that of the root end 31, i.e., an airfoil of each wing 30 is enlarged along wingspan outward, or, in other words, an airfoil around the outer end 32 is longer than that around the root end 31. With such a structure, a lift coefficient of each wing 30 can be increased and the drag coefficient can be decreased, so the lift-to-drag ratio is optimized. Besides, each wing 30 comprises a wing connecting portion 310 located at the root end 31 and a winglet 320 located at the outer end 32 of the first wing 301.

To get better structural integrity, each wing 30 is securely mounted on the fuselage 10 and is not movable or rotatable with respect to the fuselage 10. As torsion force is likely largely induced in flight started from taking off, a carbon fiber reinforced polymer (CFRP) material is the best candidate for a structure with wing body connection.

Please refer to FIGS. 6a to 6e, which show 6-6 sectional view in FIG. 4. A shape of the wing connecting portion 310 is not intended to create lift but only allow air flow under minimum drag either in vertical flight or horizontal level flight, so the cross section thereof is enclosed by certain curves or splines that can result from optimization design of aerodynamic calculation. Therefore, a longitudinal length (chord line) of the wing connecting portion 310 parallel with the length direction of the fuselage 10 is lessened from 80% to 35% of a normal wing airfoil, and a thickness of the wing connecting portion 310 is enlarged twice to triple of the normal wing (illustrated in the following as 310a to 310c). In other words, the aspect ratio after modified falls within 3 to 1, and aspect ratio 1 complies with a circular cross section. Besides, the idea can apply to airfoil National Advisory Committee for Aeronautics (NACA) series (illustrated in the following as 310d and 310e).

Precisely, a section of the wing connecting portion 310 may be in a circular shape 310a, an elliptical shape 310b, an airfoil sectional shape 310c, another airfoil sectional shape 310d, or still another airfoil sectional shape 310e. A chord line of the airfoil section shape 310c is horizontal. A chord line of said another airfoil sectional shape 310d is inclined; in other words, said another airfoil sectional shape 310d is spline shape resulting from drag optimization for the VTOL aircraft takeoff trajectory and a cruise flight operation. An outline of said still another airfoil sectional shape 310e is rounded.

In other words, the wing connecting portion 310 of the present VTOL aircraft does not have a chord line as the traditional aircraft wing 30, so streamlines cross the wing connecting portion 310 are not intended to create lift but only allow air flow. Therefore, the VTOL aircraft allows airflow to pass easily around the wing connecting portion 310 when going over a vertical flight path.

Figure 2:
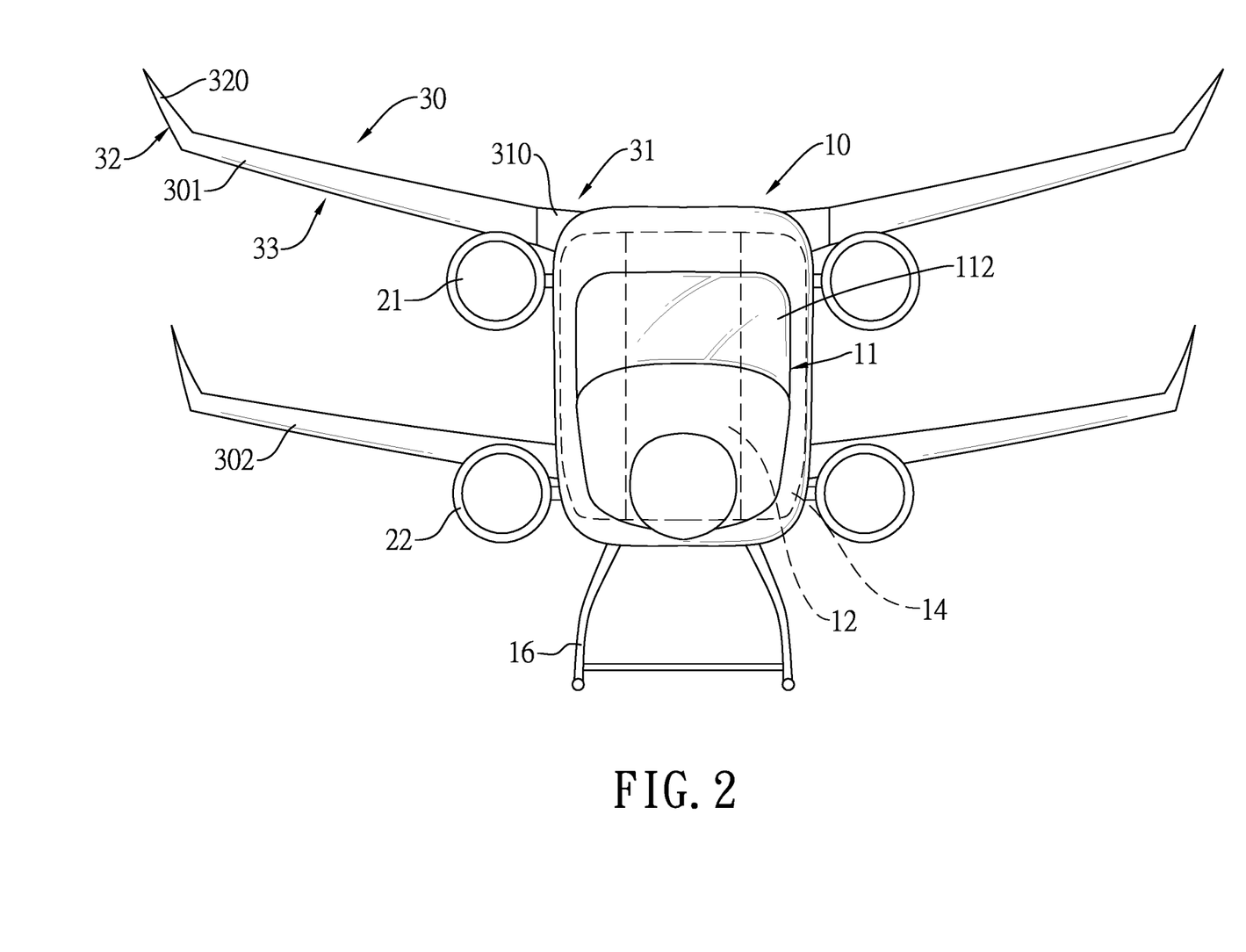
FIG. 2 is a front view of the VTOL aircraft in FIG. 1.
Figure 3:
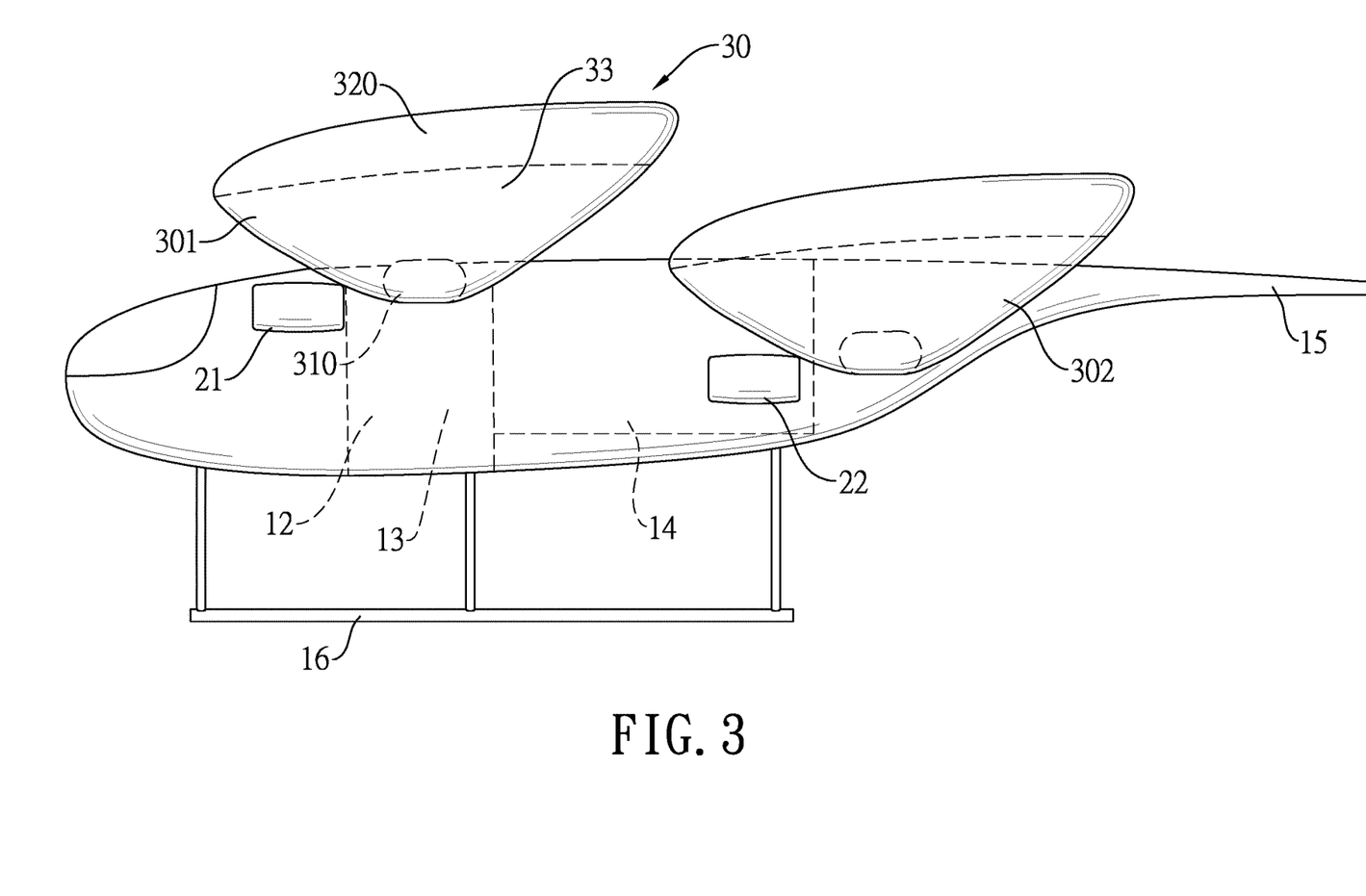
FIG. 3 is a side view of the VTOL aircraft in FIG. 1.

Each wing 30 is a dihedral wing, i.e., each wing 30 extends outward and slightly upward as shown in FIG. 2.

Please refer to FIGS. 7a to 7e. In the drawings, the pilot cabins 11 are located at upper sides of FIGS. 7a to 7e, and the tail rods 15 are located at lower sides of FIGS. 7a to 7e. The winglet 320 of each wing 30 is mounted at the outer end 32 of the wing 30. In some embodiments, the winglet 320a is shaped in a rectangle and extends at a dihedral angle. In some embodiments, the winglet 320b further extends at a dihedral angle and rearward, so that the winglet 320 is shaped in a triangle and a front edge of the winglet 320b is curved.

A structure inside the wing body 33 can be a traditional one with incorporated quadrilateral wing boxes or one with hexagons or randomly shaped. The object of multiple choices said above is to tailor the drag value along wingspan and to compensate possible yawing instability.

Figure 7A:
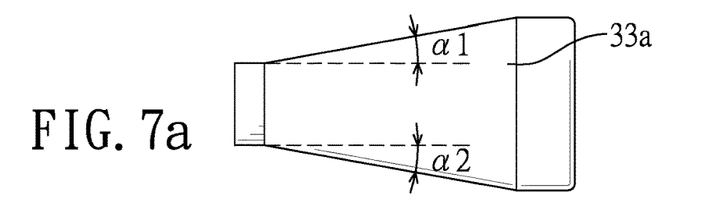
FIGS. 7a to 7e are top views of variance of the wing bodies and winglets in the VTOL aircraft in FIG. 1.

The wing body 33 of each wing 30 also has many types. In this embodiment, the wing body 33a is a single blade, and an expansion rate of a leading edge of the wing body 33a equals to that of a trailing edge of said wing body 33a. Precisely, a front angle α1 is an angle between the leading edge of the wing body 33a and a direction perpendicular to the length direction of the fuselage 10, and a rear angle α2 is an angle between the trailing edge of the wing body 33a and the direction perpendicular to the length direction of the fuselage 10. In this embodiment, the front angle α1 equals to the rear angle α2 and thus the wing body 33a is symmetric.

Figure 7B:
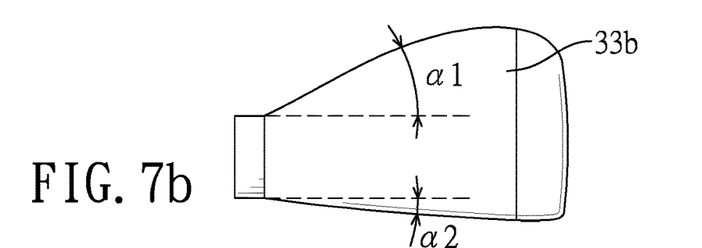
Figure 7C:
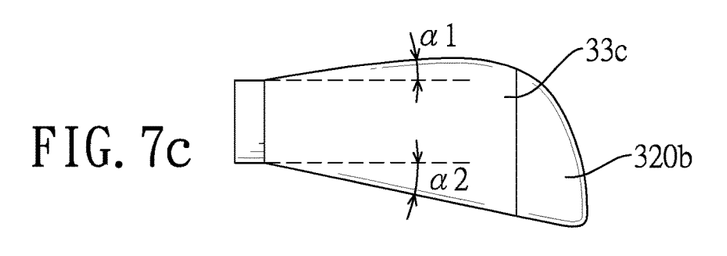

In another embodiment, a wing body 33b is also a single blade, but the expansion rate of the leading edge is larger than that of the trailing edge, i.e., the front angle α1 is larger than the rear angle α2 and thus the wing body 33b protrudes forward as shown. Instead, in a wing body 33c, the expansion rate of the leading edge is smaller than that of the trailing edge, i.e., the front angle α1 is smaller than the rear angle α2 and thus the wing body 33c protrudes rearward as shown. Thus, under such arrangement of angles, the wing body 33b and the wing body 33c can generate leading edge vortex for creating lift at very low air speed as butterflies and maple seeds do.

Figure 7D:
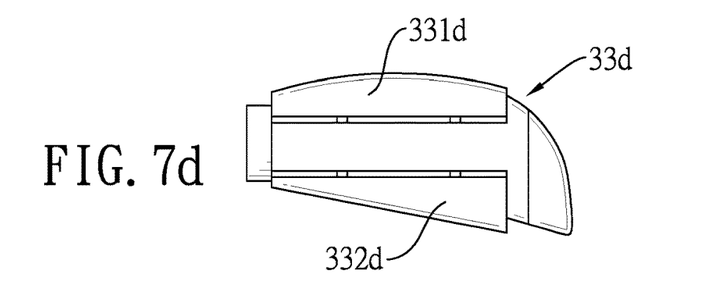

In another embodiment, each wing body 33d comprises multiple blades, which are a front blade 331d and a rear blade 332d, both the front blade 331d and the rear blade 332d are mounted between the root end 31 and the outer end 32 of the wing 30. In this way, the wing body 33d transforms to three short chord lines, so the wing body 33d allows laminar airflow on the wing body 33d even at lower fly speed.

Please refer to FIG. 7d. The front blade 331d and the rear blade 332d in a preferred embodiment are capable of moving in a direction parallel to a length direction of the fuselage 10. When the VTOL aircraft takes off or lands, the front blade 331d and the rear blade 332d move outward of the wing 30, which allows the airflow to pass easily around the wing 30 when going over a vertical flight path and thereby the resistance is decreased. And after the VTOL aircraft takes off and then on level flights, the front blade 331d moves backward and the rear blade 332d moves forward, which integrates the wing 30 as a whole so that lift of the wing 30 is increased during cruise flight operation. The front blade 331d and the rear blade 332d can be driven by a linear actuator mechanism.

Figure 7E:
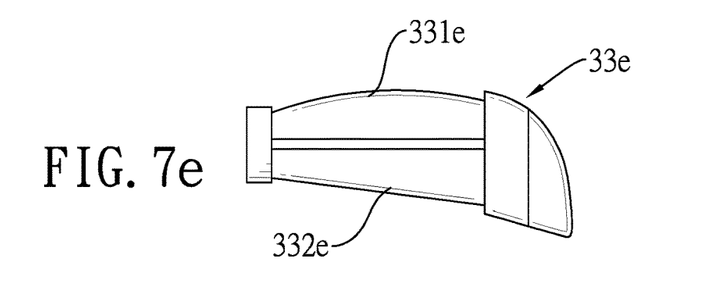
Figure 8:
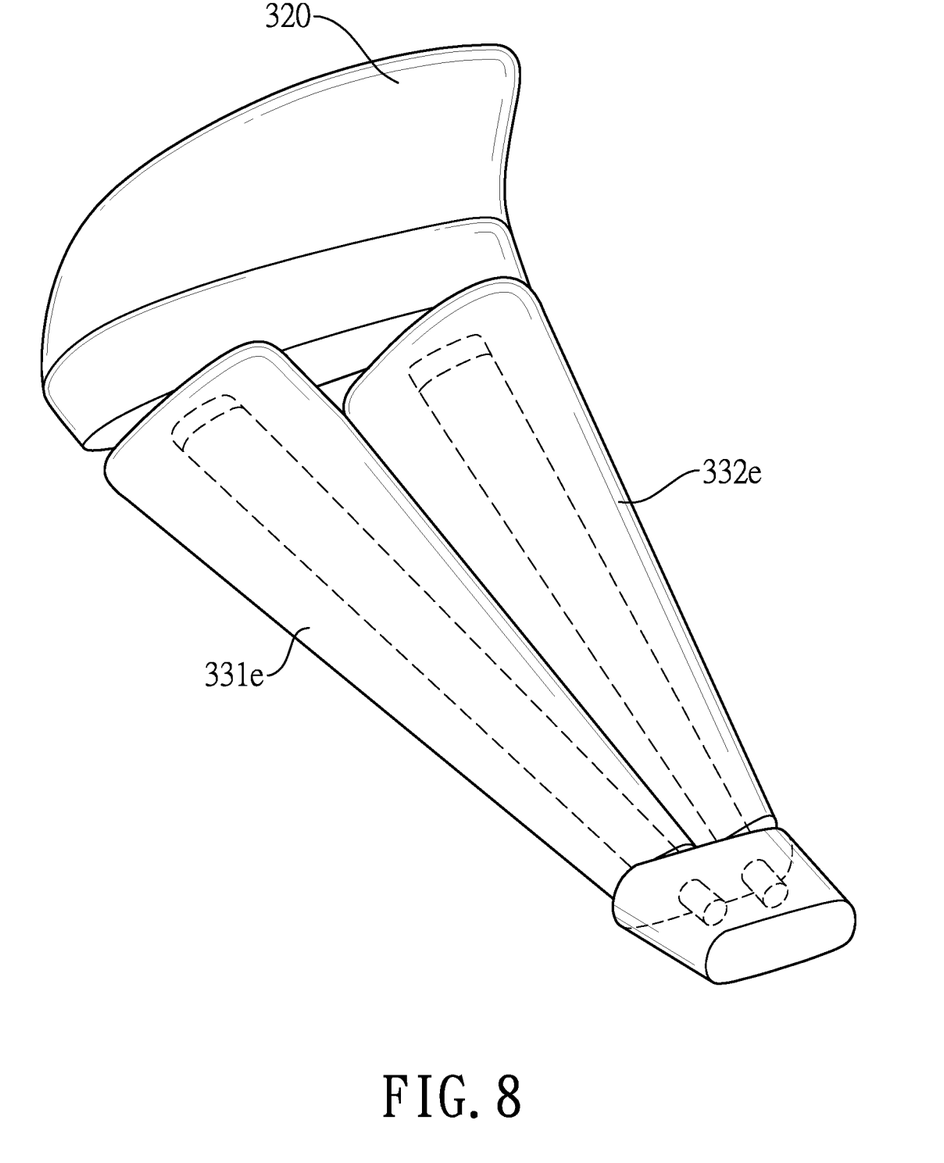
FIG. 8 is a perspective view of one kind of the wing body in the VTOL aircraft in FIG. 1.

Please refer to both FIGS. 7e and 8. In another preferred embodiment, the front blade 331e and the rear blade 332e are capable of tilting between a vertical direction and a direction parallel to the chord line. Before the VTOL aircraft takes off or lands, the front blade 331e and the rear blade 332e are tilted to be parallel to the vertical direction, and a gap is formed between the front blade 331e and the rear blade 332e, which allows the airflow to pass through the gap when going over a vertical flight path and thereby the resistance is decreased. And after the VTOL aircraft takes off and then glides, the front blade 331e and the rear blade 332e are tilted to connect each other, and the gap is covered by the front blade 331e and the rear blade 332e, which forms a continuous wing 30 in a trajectory and cruise flight operation.

The front blade 331e and the rear blade 332e can be driven by an angular actuator, such as a Direct Drive Rotary (DDR) motor, a servomotor, a stepping motor, or a direct current (DC) motor with reducer.

Besides, in the embodiment with the wing 30 comprising multiple tiltable blades, the number of the blades can be more than two.

Please refer to both FIGS. 1 to 4 again. In the first embodiment, a number of the at least one pair of wings 30 are two. Thus, the two pairs of wings 30 are a pair of first wings 301 and a pair of the second wings 302 and are arranged in tandem style. Both the first wings 301 and the second wings 302 are on the two sides of the fuselage 10 respectively.

The pair of first wings 301 is securely mounted on the upper portion of the fuselage 10 in a level slightly higher than a top portion of the fuselage 10. Besides, the first wings 301 are behind and above the first thrust units 21. In other words, the pilot cabin 11 is in front of the first thrust units 21 and the first wings 301 are along a length direction of the fuselage 10

The pair of second wings 302 is securely mounted on the lower portion of the fuselage 10, and thus the first wings 301 and the second wings 302 are in tandem style. Besides, the second wings 302 are behind and above the pair of the second thrust units 22.

Figure 9:
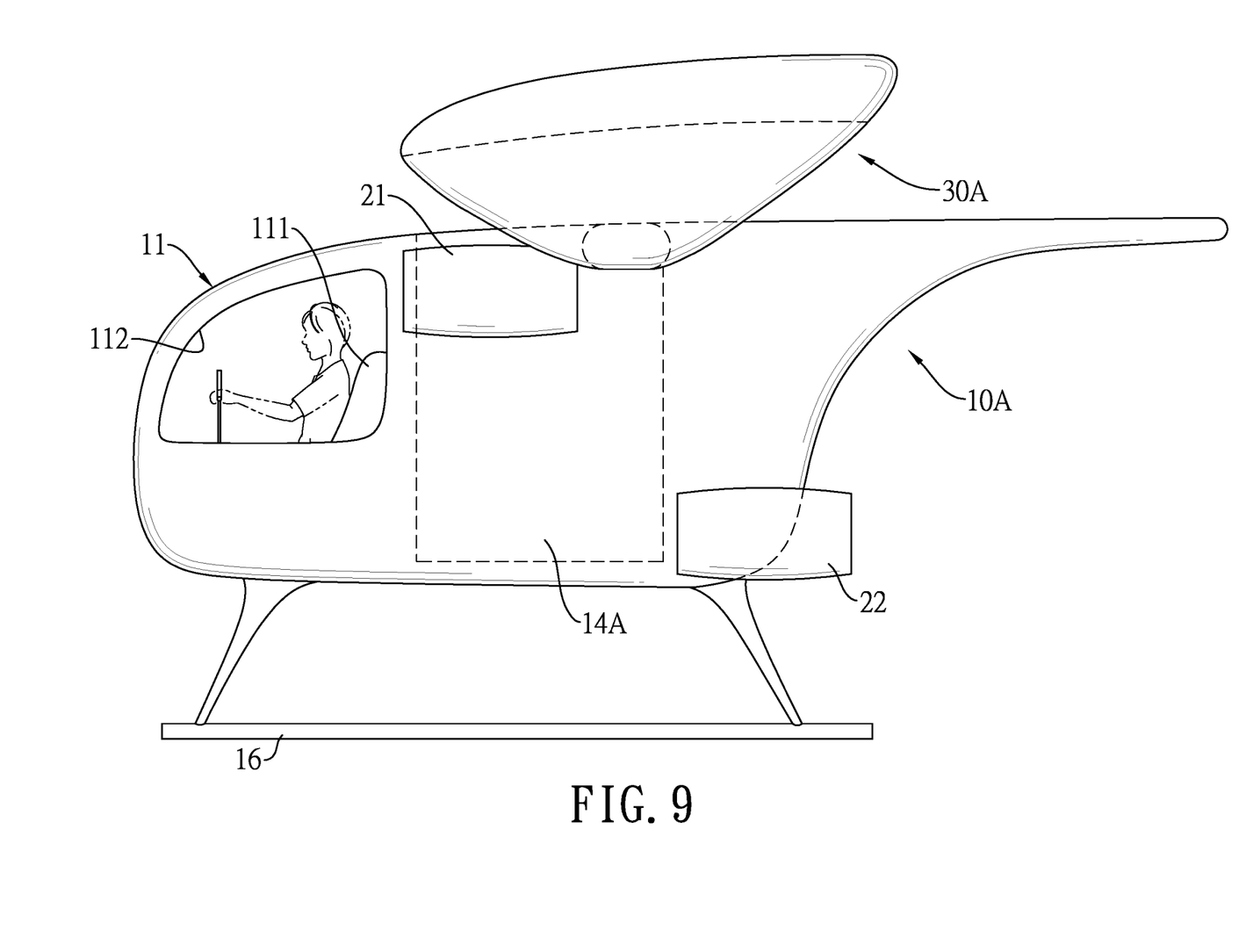
FIG. 9 is a side view of the VTOL aircraft in accordance with a second embodiment of the present invention.

Please refer to both FIG. 9. In a second embodiment, the VTOL aircraft is similar with the first embodiment, but differences are that the fuselage 10A is shorter, and the VTOL aircraft comprises only one pair of wings 30A. In other words, the VTOL aircraft still comprises two pairs of thrust units, which are two first thrust units 21 and two second thrust units 22, and the wings 30A are mounted behind the first thrust units 21. In addition, another difference is that the payload cabin 14A is shorter and is disposed between two first thrust units 21 and two second thrust units 22.

On the contrary, in another embodiment, the fuselage 10 can be longer. In this embodiment, the VOLT aircraft comprises three pairs of thrust units and three pairs of wings (not shown in the drawings). The three pairs of thrust units are two first thrust units, two middle thrust units, and two second thrust units. The first thrust units are mounted on an upper portion of the fuselage, the middle thrust units are mounted on a lower portion of the fuselage, and the second thrust units are mounted on the upper portion of the fuselage and leveled on the same level with the first thrust units. Three pairs of wings are mounted behind and above the three thrust units respectively. Therefore, the thrust units and the wings are also in tandem style.

Another embodiment of the present VTOL aircraft is an unmanned aerial vehicle (UAV), which is smaller and does not comprise any pilot cabin in the fuselage (not shown in the drawings).

Consequently, when the present VTOL aircraft is landing or taking off, the first thrust units 21 and the second thrust units 22 are tilted to be vertical so that the first thrust units 21 and the second thrust units 22 can provide upward forces to lift the present VTOL aircraft stably. Meanwhile, because a longitudinal length of the root end 31 of each wing 30 parallel with the length direction is smaller, the airflow can pass around the wing, and thereby drags of the wings are low. When the present VTOL aircraft is cruising or gliding, the first thrust units 21 and the second thrust units 22 are tilted to be horizontal or in a direction according to a cruising way, so that the first thrust units 21 and the second thrust units 22 can provide thrust force and lift. Meanwhile, the wings also provide lift, so that the first thrust units 21 and the second thrust units 22 can operate in a low mode, which makes the present VTOL aircraft save more energy. Besides, even one or more thrust units are broken during flight, the present VTOL aircraft can glide with the wings 30 and land safely.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A vertical taking-off and landing (VTOL) aircraft comprising:
    a fuselage comprising a length direction;
    a pair of first thrust units tiltably mounted on an upper portion of the fuselage and mounted on two sides of the fuselage respectively;
    a pair of first wings securely mounted on the upper portion of the fuselage and on the two sides of the fuselage respectively, and the first wings disposed behind and above the pair of first thrust units; each one of the first wings comprising:
        a root end mounted on the fuselage; and
        an outer end opposite the root end of the first wing; a longitudinal length of the outer end of the first wing parallel with the length direction being larger than that of the root end of the first wing;
    a pair of second thrust units tiltably mounted on a lower portion of the fuselage and mounted on the two sides of the fuselage respectively; the second thrust units being disposed behind the first thrust units; and
    a pair of second wings securely mounted on the lower portion of the fuselage and mounted on the two sides of the fuselage respectively, and the second wings disposed behind and above the pair of the second thrust units; each one of the second wings comprising:
        a root end mounted on the fuselage; and
        an outer end opposite the root end of the second wing; a longitudinal length of the outer end of the second wing parallel with the length direction being larger than that of the root end of the second wing.

2. The VTOL aircraft as claimed in claim 1, wherein each one of the first wings comprises:
    a winglet mounted at the outer end of the first wing; the winglet extending at a dihedral angle.

3. The VTOL aircraft as claimed in claim 1, wherein each one of the first wings and second wings comprises:
    a winglet mounted at the outer end the second wing; the winglet extending at a dihedral angle.

4. The VTOL aircraft as claimed in claim 2, wherein the winglet extends at a dihedral angle and rearward.

5. The VTOL aircraft as claimed in claim 3, wherein the winglet extends at a dihedral angle and rearward.

6. The VTOL aircraft as claimed in claim 1, wherein each one of the first wings comprises:
    a wing connecting portion at the root end of the first wing, the first wing mounted on the fuselage through the wing connecting portion; a section of the wing connecting portion being in a circular shape, an elliptical shape, or an airfoil shape.

7. The VTOL aircraft as claimed in claim 1, wherein each one of the first wings and the second wings comprises:
    a wing connecting portion at the root end of the first wing or the second wing; the first wing or the second wing mounted on the fuselage through the wing connecting portion; a section of each one of the wing connecting portions being in a circular shape, an elliptical shape, or an airfoil shape.

8. The VTOL aircraft as claimed in claim 1, wherein each one of the first wings is a single blade, and an expansion rate of a leading edge of each one of the first wing equals to that of a trailing edge of said first wing.

9. The VTOL aircraft as claimed in claim 7, wherein each one of the first wings and the second wings is a single blade, and an expansion rate of a leading edge of each one of the first wings and the second wings equals to that of a trailing edge of said first wing or second wing.

10. The VTOL aircraft as claimed in claim 1, wherein each one of the first wings is a single blade, and an expansion rate of a leading edge of each one of the first wings is larger than that of a trailing edge of said first wing.

11. The VTOL aircraft as claimed in claim 7, wherein each one of the first wings and the second wings is a single blade, and an expansion rate of a leading edge of each one of the first wings and the second wings is larger than that of a trailing edge of said first wing or second wing.

12. The VTOL aircraft as claimed in claim 1, wherein each one of the first wings is a single blade, and an expansion rate of a leading edge of each one of the first wings is less than that of a trailing edge of said first wing.

13. The VTOL aircraft as claimed in claim 7, wherein each one of the first wings and the second wings is a single blade, and an expansion rate of a leading edge of each one of the first wings and the second wings is less than that of a trailing edge of said first wing or second wing.

14. The VTOL aircraft as claimed in claim 1, wherein each one of the first wings comprises multiple blades, which are:
   a front blade mounted between the root end and the outer end of the first wing; the front blade being capable of moving in a direction parallel to the length direction of the fuselage; and
   a rear blade mounted between the root end and the outer end of the first wing and behind the front blade; the rear blade being capable of moving in a direction parallel to the length direction of the fuselage.

15. The VTOL aircraft as claimed in claim 7, wherein each one of the first wings and the second wings comprises two blades, which are:
   a front blade mounted between the root end and the outer end of the first wing or the second wing; the front blade being capable of moving in a direction parallel to the length direction of the fuselage; and
   a rear blade mounted between the root end and the outer end of the first wing or the second wing and behind the front blade; the rear blade being capable of moving in a direction parallel to the length direction of the fuselage.

16. The VTOL aircraft as claimed in claim 1, wherein each one of the first wings comprises multiple blades, which are:
   a front blade tiltably mounted between the root end and the outer end of the first wing; and
   a rear blade tiltably mounted between the root end and the outer end of the first wing and behind the front blade.

17. The VTOL aircraft as claimed in claim 1, wherein each one of the first wings and the second wings comprises two blades, which are:
   a front blade tiltably mounted between the root end and the outer end of the first wing or the second wing; and
   a rear blade tiltably mounted between the root end and the outer end of the first wing or the second wing and behind the front blade.

18. The VTOL aircraft as claimed in claim 1, wherein the fuselage comprises:
   a pilot cabin in front of the first thrust units and the first wings in the length direction of the fuselage.

19. The VTOL aircraft as claimed in claim 1, wherein the fuselage comprises:
   a tail rod extending horizontally and disposed at a rear end of the fuselage.

* * * * *